United States Patent
Tamai

(10) Patent No.: US 10,572,971 B2
(45) Date of Patent: Feb. 25, 2020

(54) PROJECTION DEVICE, PROJECTION METHOD AND PROGRAM STORAGE MEDIUM

(71) Applicant: NEC Platforms, Ltd., Kawasaki-shi, Kanagawa (JP)

(72) Inventor: Junichi Tamai, Kanagawa (JP)

(73) Assignee: NEC PLATFORMS, LTD., Kanagawa (JP)

(*) Notice: Subject to any disclaimer, the term of this patent is extended or adjusted under 35 U.S.C. 154(b) by 10 days.

(21) Appl. No.: 15/748,689

(22) PCT Filed: Aug. 31, 2016

(86) PCT No.: PCT/JP2016/003980
§ 371 (c)(1),
(2) Date: Jan. 30, 2018

(87) PCT Pub. No.: WO2017/038096
PCT Pub. Date: Mar. 9, 2017

(65) Prior Publication Data
US 2019/0005607 A1    Jan. 3, 2019

(30) Foreign Application Priority Data
Sep. 1, 2015  (JP) ................. 2015-171877

(51) Int. Cl.
*G06T 3/00* (2006.01)
*G06T 5/00* (2006.01)
(Continued)

(52) U.S. Cl.
CPC .............. *G06T 3/005* (2013.01); *G06T 5/006* (2013.01); *G06T 5/20* (2013.01); *G06T 7/0002* (2013.01); *G06T 2207/30168* (2013.01)

(58) Field of Classification Search
CPC combination set(s) only.
See application file for complete search history.

(56) References Cited

U.S. PATENT DOCUMENTS 9,137,504 B2 * 9/2015 Gelb .................... H04N 9/3147
2007/0110304 A1  5/2007 Tsukada
(Continued)

FOREIGN PATENT DOCUMENTS

| CN | 102129680 A | 7/2011 |
| CN | 102484724 A | 5/2012 |

(Continued)

OTHER PUBLICATIONS

Extended European Search Report for EP Application No. EP16841129.6 dated Apr. 8, 2019.
(Continued)

*Primary Examiner* — Ryan M Gray

(57) ABSTRACT

To display an image even on a projection surface having complex unevenness similarly to a flat, a projection device includes: a storage unit storing at least a pattern image for detecting distortion depending on a state of the surface, an expected image associated with a displayed image of the pattern image displayed on a flat, and a desired projection image; a projection unit projecting an image including the pattern image and the desired projection image; an image acquisition unit acquiring a displayed image of the pattern image, and extracting a distortion image; a distortion amount calculating unit calculating a distortion parameter for distortion by comparing the expected image with the distortion image; a distortion correction processing unit correcting the projected desired projection image by using the distortion parameter; and an image output unit outputting, to the projection unit, image data including the corrected desired projection image and the pattern image.

10 Claims, 18 Drawing Sheets

(51) Int. Cl.
*G06T 5/20* (2006.01)
*G06T 7/00* (2017.01)

(56) References Cited

U.S. PATENT DOCUMENTS

| | | |
|---|---|---|
| 2007/0230815 A1 | 10/2007 | Park et al. |
| 2010/0002204 A1* | 1/2010 | Jung .................... H04N 9/3147 353/122 |
| 2011/0176007 A1 | 7/2011 | Ding et al. |
| 2012/0127323 A1* | 5/2012 | Kasuya .................. G03B 17/54 348/189 |
| 2012/0176415 A1* | 7/2012 | Chao .................... H04N 9/3173 345/666 |
| 2013/0077059 A1 | 3/2013 | Marti et al. |
| 2014/0204204 A1 | 7/2014 | Sumiyoshi et al. |
| 2014/0340529 A1* | 11/2014 | Shibata ................ H04N 9/3185 348/189 |
| 2017/0059313 A1* | 3/2017 | Lee ...................... H04N 17/002 |

FOREIGN PATENT DOCUMENTS

| | | |
|---|---|---|
| CN | 103765870 A | 4/2014 |
| JP | 2004-140845 A | 5/2004 |
| JP | 2013-118596 A | 6/2013 |
| JP | 2014-042262 A | 3/2014 |
| JP | 2014-150540 A | 8/2014 |
| JP | 2015-080190 A | 4/2015 |
| JP | 2015-152686 A | 8/2015 |
| WO | 2005/057941 A1 | 6/2005 |

OTHER PUBLICATIONS

International Search Report for PCT Application No. PCT/JP2016/003980, dated Nov. 22, 2016.
English translation of Written opinion for PCT Application No. PCT/JP2016/003980.
Chinese Office Action for CN Application No. 201680049716.8 dated Oct. 29, 2019 with English Translation.

\* cited by examiner

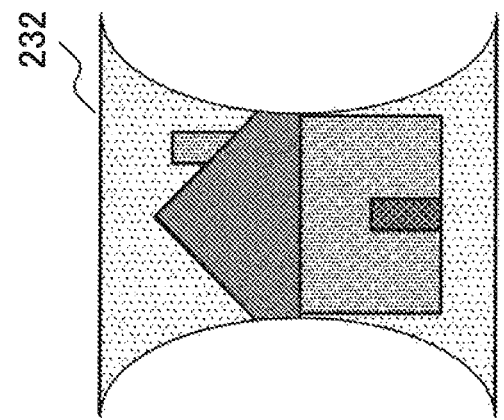
Fig.15
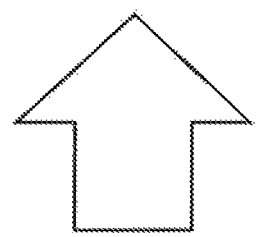
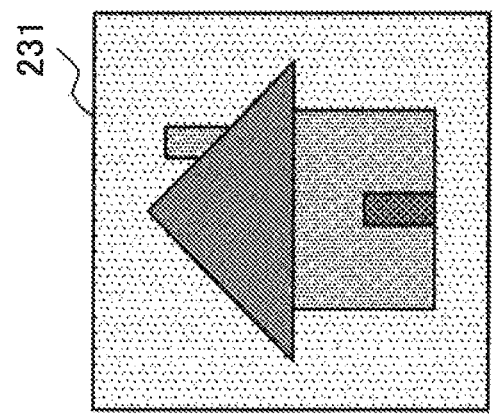

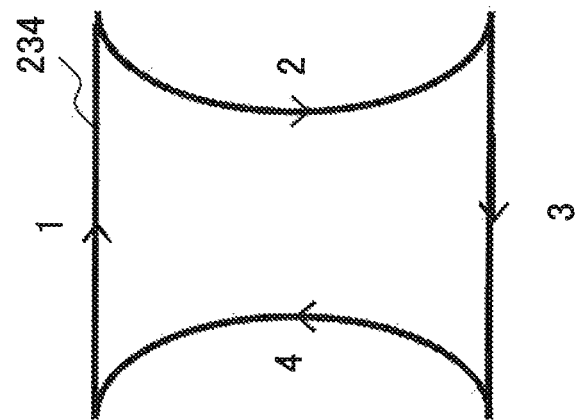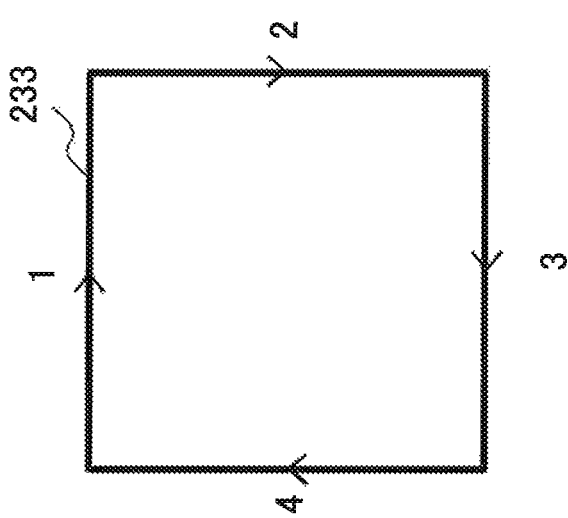
Fig.16

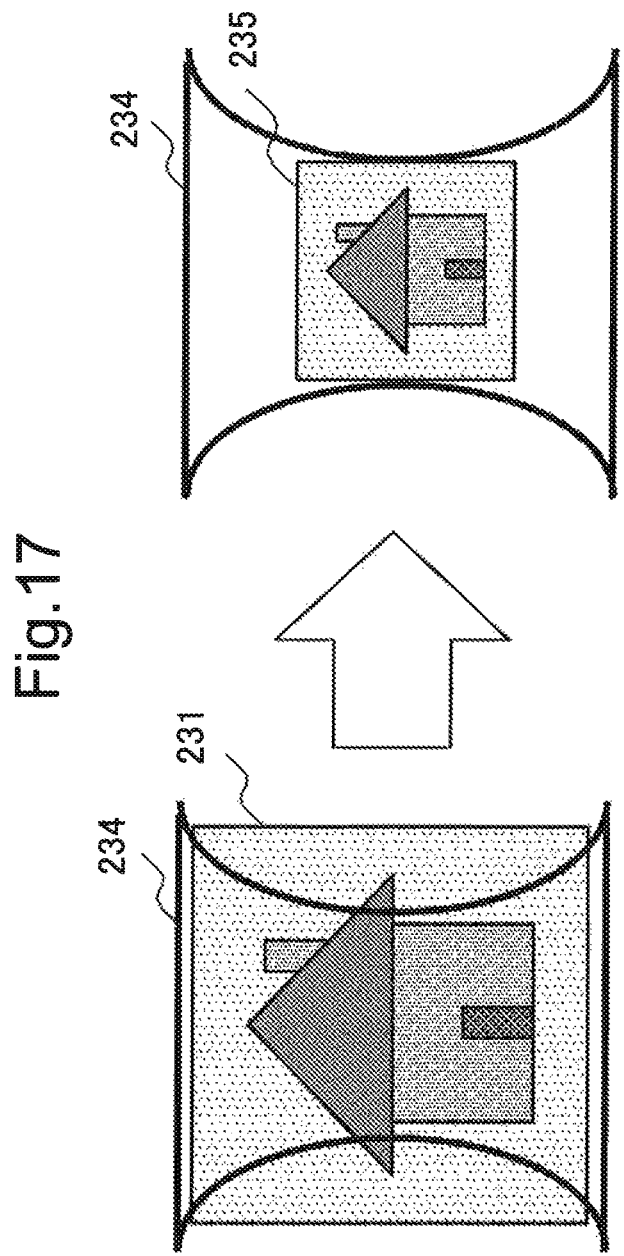

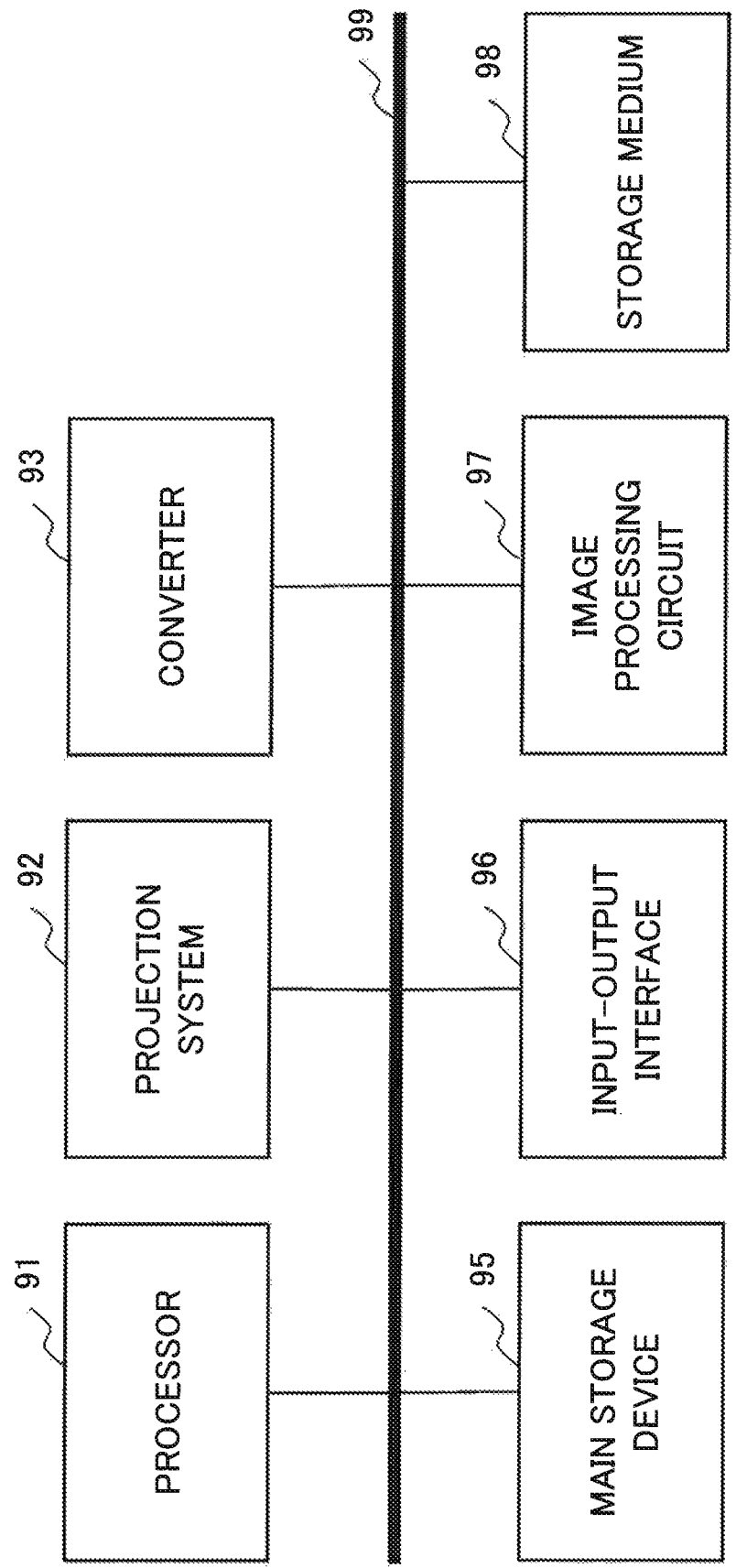

PROJECTION DEVICE, PROJECTION METHOD AND PROGRAM STORAGE MEDIUM

This application is a National Stage Entry of PCT/JP2016/003980 filed on Aug. 31, 2016, which claims priority from Japanese Patent Application 2015-171877 filed on Sep. 1, 2015, the contents of all of which are incorporated herein by reference, in their entirety.

TECHNICAL FIELD

The present invention relates to a projection device, a projection method, and a projection program. In particular, the present invention relates to a projection device, a projection method, and a projection program for projecting an image on a projection surface having unevenness.

BACKGROUND ART

A general projector is manufactured based on a premise that an image is projected on a flat wall surface. In such a projector, an image to be projected on a wall surface may be distorted depending on a positional relationship between the projector and the wall surface. For example, when a projecting direction is not straight with respect to a wall surface, an image may be projected with different magnification ratios between a vertical direction and a horizontal direction. In such a case, it is possible to eliminate distortion of an image by using a keystone correction function. PTL 1 discloses an example of keystone correction.

In order to appropriately project an image on a wall surface, it is effective to actually capture an image projected on the wall surface, and to perform correction, based on the captured image. PTLs 2 and 3 disclose devices for capturing a projected image and adjusting the projected image, based on a captured pattern.

Further, in order to project an image to be projected on a curved surface, a technique other than keystone correction is necessary. PTL 4 discloses a technique for correcting distortion of a displayed image even on a surface having unevenness or a projection surface of a curved surface.

CITATION LIST

Patent Literature

[PTL 1] Japanese Laid-open Patent Publication No. 2014-42262
[PTL 2] Japanese Laid-open Patent Publication No. 2014-150540
[PTL 3] Japanese Laid-open Patent Publication No. 2013-118596
[PTL 4] Japanese Laid-open Patent Publication No. 2004-140845

SUMMARY OF INVENTION

Technical Problem

According to the techniques in PTLs 1 to 3, it is possible to handle distortion of an image to be projected on a flat wall surface. However, in the techniques in PTLs 1 to 3, it is not possible to handle distortion of an image to be projected on a wall surface having unevenness.

Further, according to a device in PTL 4, it is possible to project an image even on a projection surface having unevenness or a curved surface by approximating a projection surface having unevenness to an imaginary flat projection surface, or by capturing a specific projected pattern by a camera and measuring a distance by using a principle of triangulation. However, in the device in PTL 4, there is a problem that it takes time for distance measurement, since a distance is measured by using a principle of triangulation. Further, in the device in PTL 4, there is a problem that some unevenness may be overlooked, when an uneven surface is complicated, since the device can measure only a distance to a position where a pattern is projected.

An object of the present invention is to provide a projection device that enables to display an image even on a projection surface having complex unevenness, as well as on a flat surface.

Solution to Problem

A projection device according to the present invention includes: a storage unit that stores at least a pattern image for detecting distortion depending on a surface state of a projection surface, an expected image associated with a displayed image when the pattern image is displayed on a flat surface, and a desired projection image; a projection unit that projects, on the projection surface, an image including the pattern image and the desired projection image; an image acquisition unit that acquires a displayed image of the pattern image displayed on the projection surface, and extracts a distortion image; a distortion amount calculating unit that calculates a distortion parameter relating to distortion of the projection surface by comparing the expected image with the distortion image; a distortion correction processing unit that corrects the desired projection image to be projected on the projection surface, by using the distortion parameter; and an image output unit that outputs, to the projection unit, image data including the desired projection image corrected by the distortion correction processing unit, and the pattern image.

A projection method according to the present invention includes: projecting a pattern image for detecting distortion depending on a surface state of a projection surface, on the projection surface; acquiring a displayed image of the pattern image displayed on the projection surface, and extracting a distortion image; calculating a distortion parameter of the projection surface, by comparing an expected image associated with a displayed image when the pattern image is displayed on a flat surface, with the distortion image; correcting a desired projection image to be projected on the projection surface, by using the distortion parameter; and projecting the corrected desired projection image, on the projection surface.

A projection program according to the present invention causes a computer to execute: processing of projecting a pattern image for detecting distortion depending on a surface state of a projection surface, on the projections surface; processing of acquiring a displayed image of the pattern image displayed on the projection surface, and extracting a distortion image; processing of calculating a distortion parameter of the projection surface by comparing an expected image associated with a displayed image when the pattern image is displayed on a flat surface, with the distortion image; processing of correcting a desired projection image to be projected on the projection surface, by using the distortion parameter; and processing of projecting the corrected desired projection image on the projection surface.

Advantageous Effects of Invention

According to the present invention, it is possible to provide a projection device that enables to display an image even on a projection surface having complex unevenness, as well as on a flat surface.

BRIEF DESCRIPTION OF DRAWINGS

FIG. 15 is a conceptual diagram illustrating an example of end pixel calibration by the projection device according to the third example embodiment of the present invention.

FIG. 16 is a conceptual diagram for describing end pixel reference of an image projected by the projection device according to the third example embodiment of the present invention.

FIG. 17 is a conceptual diagram for describing an example in which a shrunk expected image is generated by the projection device according to the third example embodiment of the present invention.

FIG. 18 is a block diagram illustrating an example of a hardware configuration of a projection device according to an example embodiment of the present invention.

DESCRIPTION OF EMBODIMENTS

Figure 1:
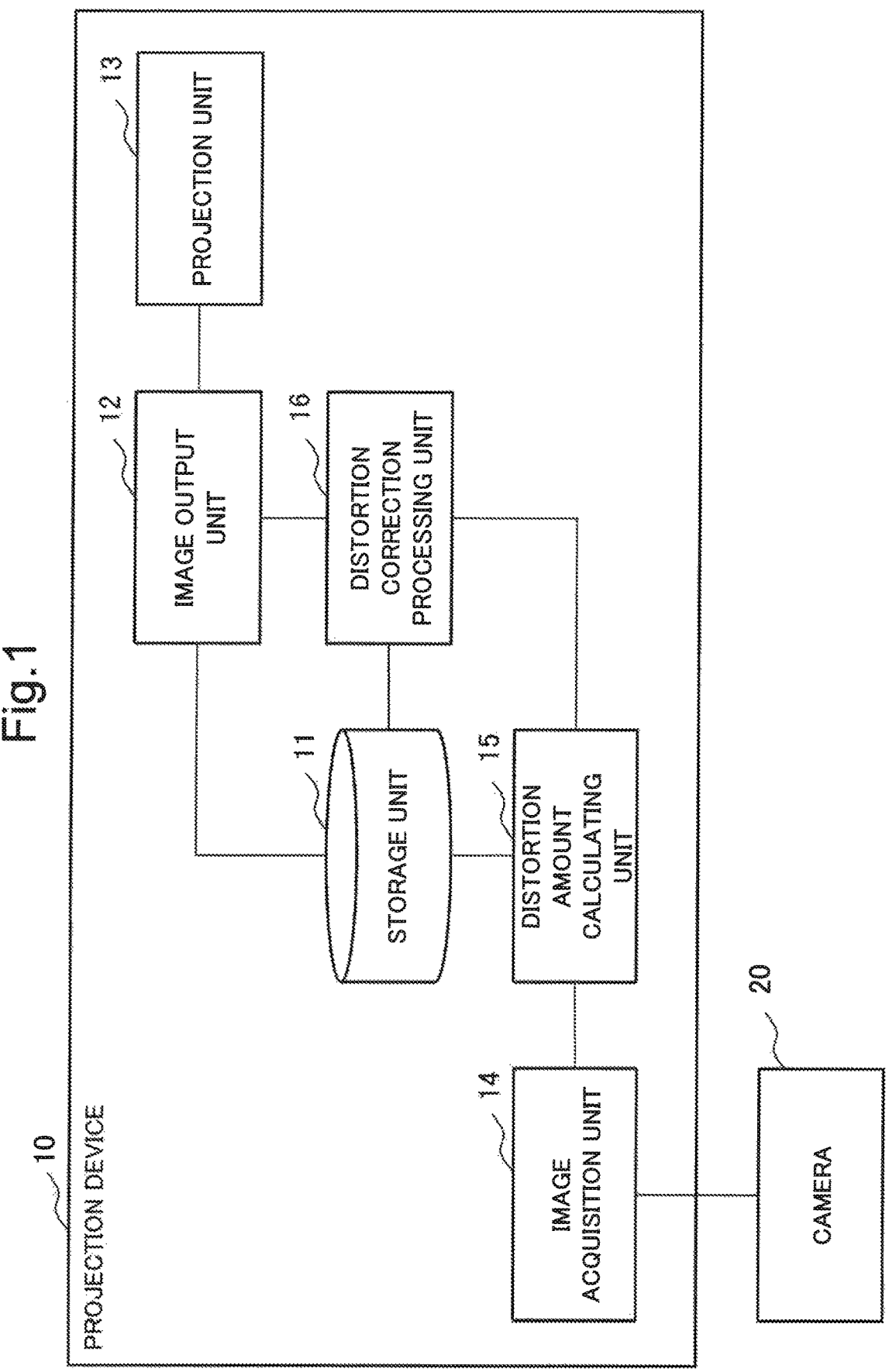
FIG. 1 is a block diagram illustrating a configuration of a projection device according to a first example embodiment of the present invention.

In the following, example embodiments for implementing the present invention are described with reference to the drawings. Note that, in the below-mentioned example embodiments, technically preferred limitations are provided in order to implement the present invention. However, the scope of the present invention is not limited to the following. Note that, in all the drawings used for describing the following example embodiments, unless a reason is specifically mentioned, same portions are indicated with same reference numerals. Further, repeated description on a same configuration/operation may be omitted.

(Configuration)

Figure 2:
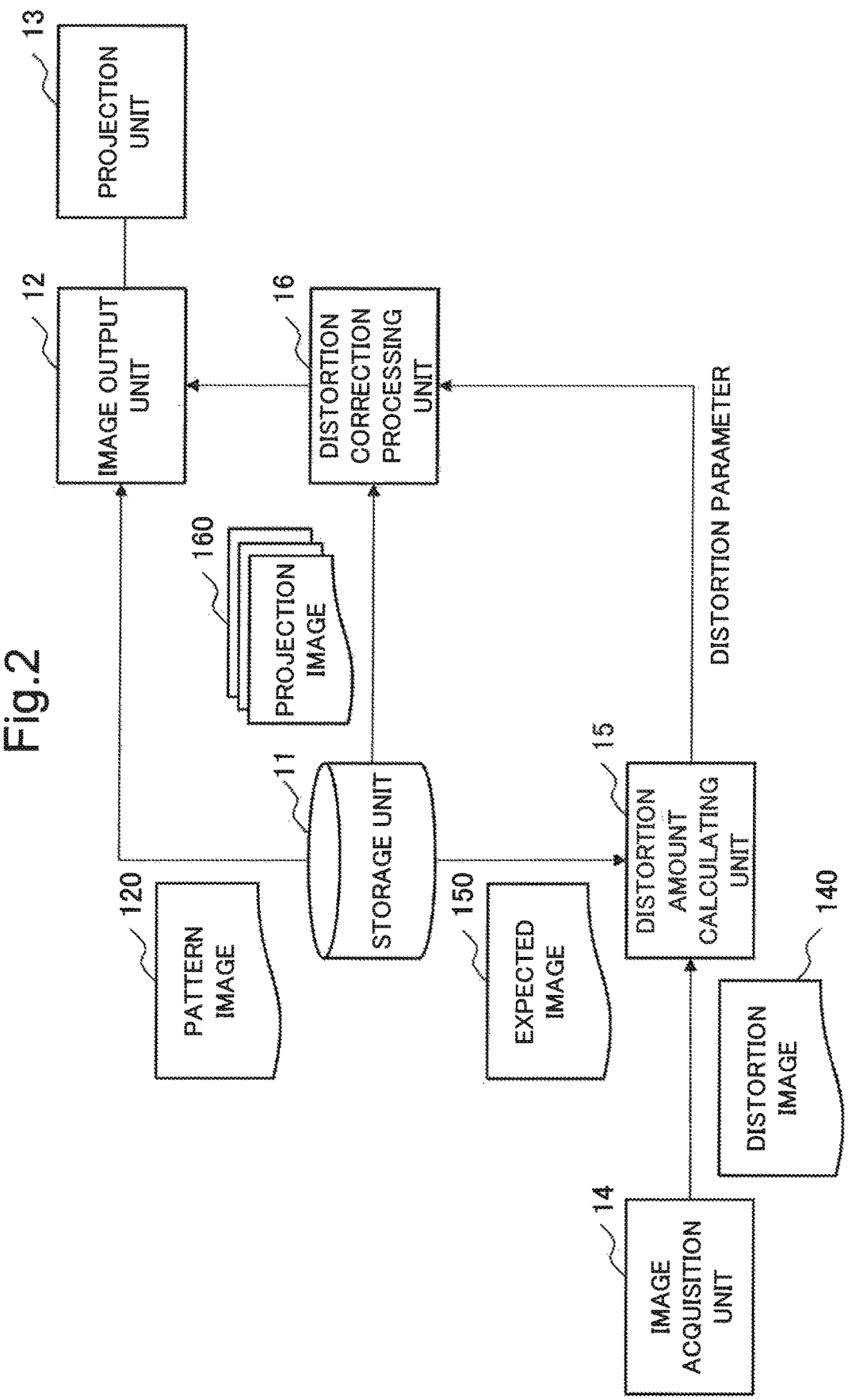
FIG. 2 is a conceptual diagram illustrating a flow of data between constituent elements of the projection device according to the first example embodiment of the present invention.

First of all, a configuration of a projection device 10 according to a first example embodiment of the present invention is described with reference to the drawings. FIG. 1 is a block diagram illustrating a configuration of the projection device 10 according to the present example embodiment. FIG. 2 is a conceptual diagram for describing a flow of data between constituent elements of the projection device 10 according to the present example embodiment.

The projection device 10 according to the present example embodiment includes a storage unit 11, an image output unit 12, a projection unit 13, an image acquisition unit 14, a distortion amount calculating unit 15, and a distortion correction processing unit 16. Further, the projection device 10 is configured to acquire image data captured by a camera 20. Note that the projection device 10 may include the camera 20 (imaging means).

The storage unit 11 stores various image data. The storage unit 11 stores at least a pattern image (pattern image 120) for detecting distortion depending on a surface state of a projection surface, an expected image (expected image 150) associated with a displayed image when the pattern image is displayed on a flat surface, and a desired projection image (projection image 160). Further, the storage unit 11 may also be configured to store a distortion image 140 corresponding to a displayed image of the pattern image 120 displayed on a projection surface, and a distortion parameter.

The image output unit 12 outputs, to the projection unit 13, image data such as the pattern image 120 and the projection image 160 subjected to distortion correction. Specifically, the image output unit 12 outputs, to the projection unit 13, image data including the projection image 160 corrected by the distortion correction processing unit 16, and the pattern image 120.

The projection unit 13 projects image data output from the image output unit 12. Specifically, the projection unit 13 projects an image including the pattern image 120 and the projection image 160 on a projection surface. The projection unit 13 may be configured by a general projector.

The image acquisition unit 14 acquires image data captured by the camera 20. The image acquisition unit 14 extracts, from the acquired image data, a displayed image of the pattern image 120 (hereinafter, distortion image 140). Specifically, the image acquisition unit 14 acquires the distortion image 140 corresponding to a displayed image of the pattern image 120 displayed on a projection surface.

The distortion amount calculating unit 15 calculates a distortion amount (also referred to as a distortion parameter) of a projection surface by comparting the distortion image 140 with the expected image 150.

The distortion correction processing unit 16 performs distortion correction in such a manner that the desired projection image 160 is displayed on a projection surface, by using the distortion amount calculated by the distortion amount calculating unit 15. Specifically, the distortion correction processing unit 16 corrects the projection image 160 to be projected on a projection surface, by using the distortion amount calculated by the distortion amount calculating unit 15.

The camera 20 is connected to the projection device 10. The camera 20 captures a projection surface, and outputs the captured image data to the image acquisition unit 14. The camera 20 may be configured by a general camera.

(Main Calibration)

FIG. 3 to FIG. 6 are conceptual diagrams for describing calibration in the present example embodiment (hereinafter, main calibration). In the present example embodiment, an image is displayed on a projection surface having unevenness with same quality as when the image is projected on a flat surface, by calculating a moving amount (distortion) of the image due to unevenness on the projection surface for each area, when the image is projected on the projection surface having unevenness.

Figure 3:
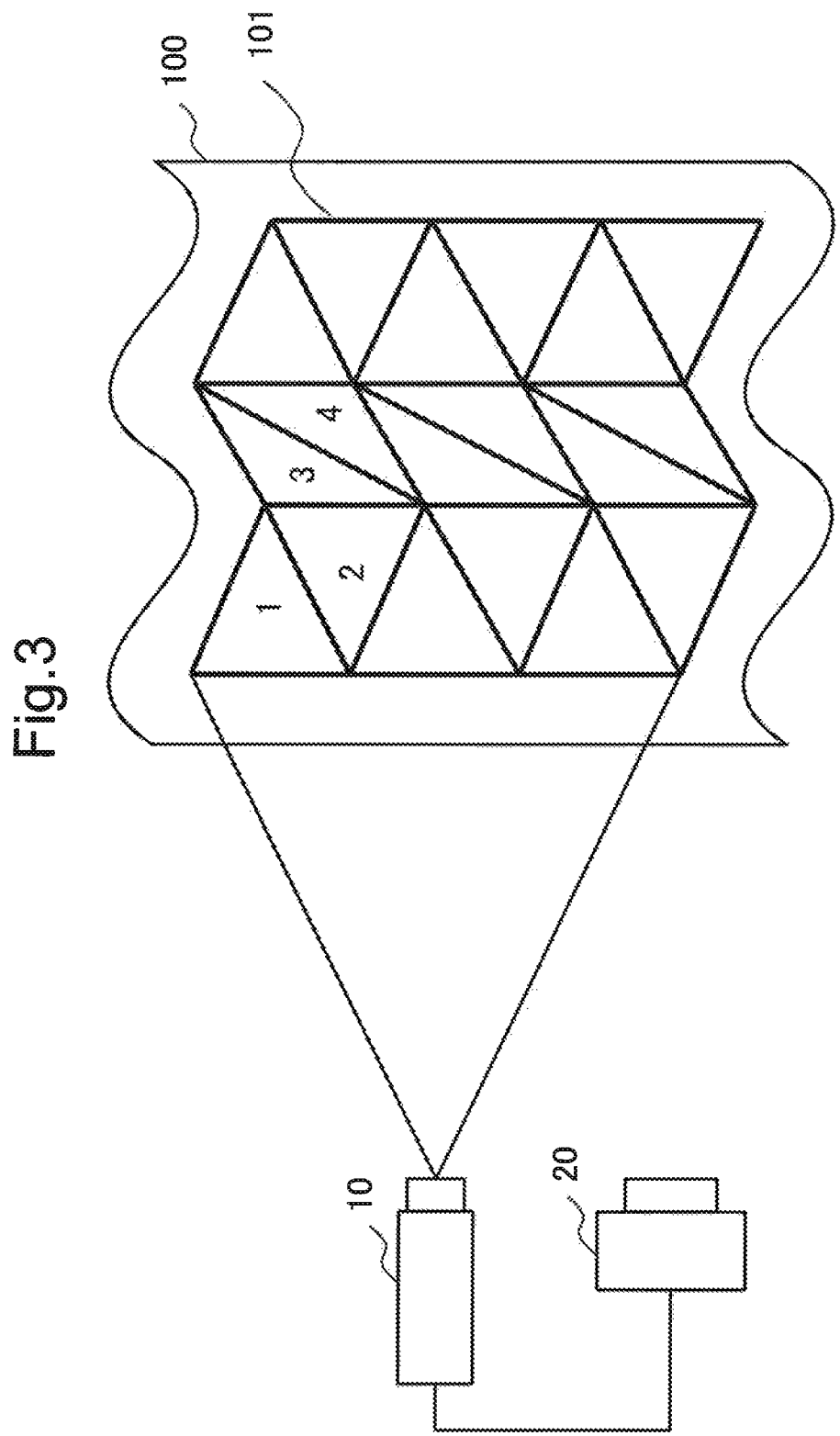
FIG. 3 is a conceptual diagram for describing an example in which the projection device according to the first example embodiment of the present invention projects a pattern image on an uneven surface.

FIG. 3 illustrates an example of a displayed image 101 to be displayed when the pattern image 120 constituted by a plurality of triangles is projected on an uneven surface 100. The image acquisition unit 14 extracts the distortion image 140 from the displayed image 101. In FIG. 3, numerals indicated within some triangles denote numbers given to these triangles. Note that a part of the pattern image 120 may be projected successively, or the entirety of the pattern image 120 may be displayed all at once.

A size of a triangle constituting the pattern image may be changed depending on a size of unevenness. For example, on a projection surface having large unevenness, a triangle constituting the pattern image 120 is made small. Making a triangle smaller enhances image quality better, since correction accuracy is more enhanced. Further, for example, on a projection surface having small unevenness, a triangle constituting the pattern image 120 is made large. Making a triangle larger enables time required for calibration to be shorter.

The camera 20 captures the uneven surface 100. The displayed image 101 displayed on the uneven surface 100 includes distortion depending on a state of the uneven surface 100.

Figure 4:
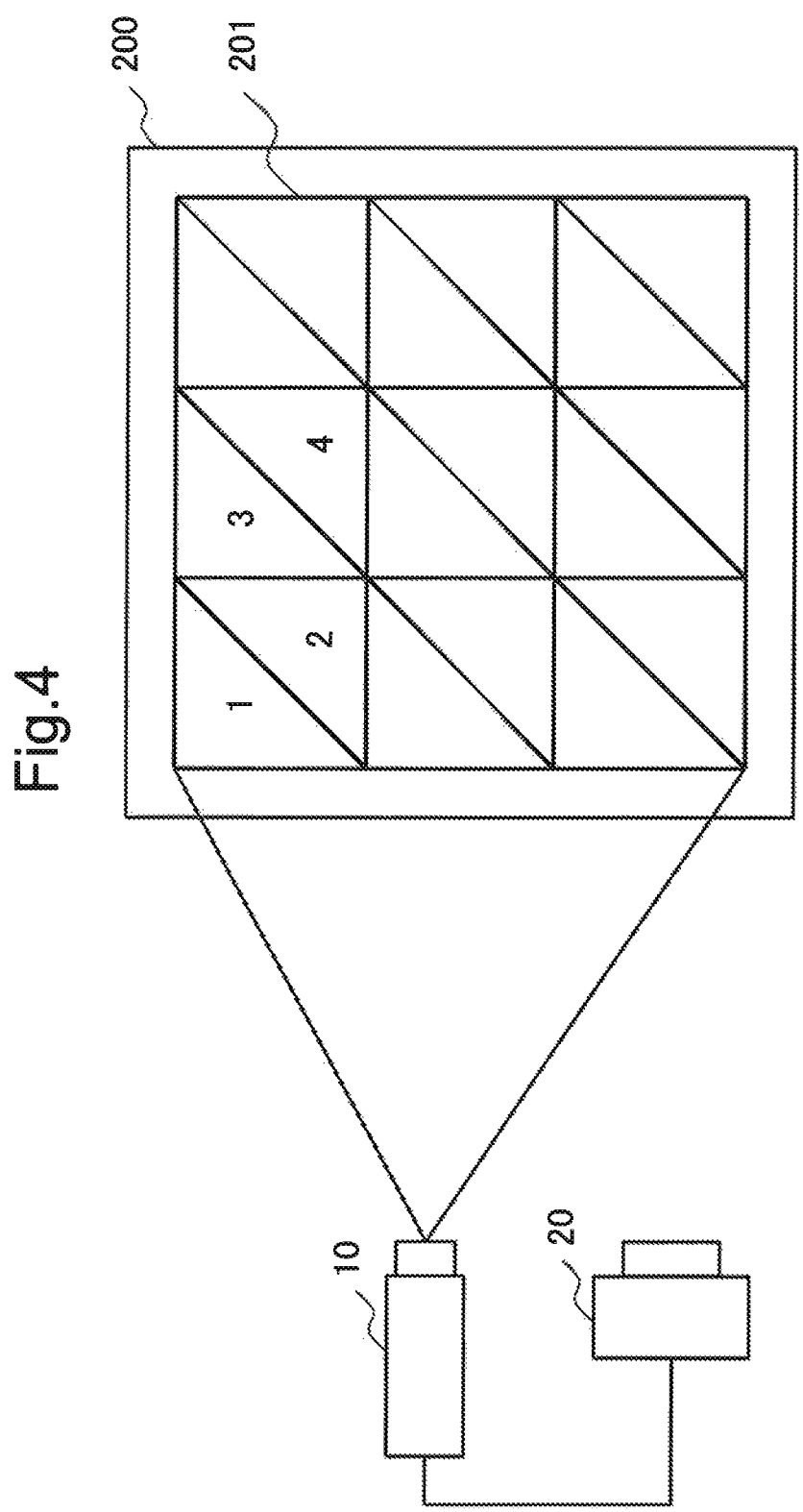
FIG. 4 is a conceptual diagram for describing an expected image to be obtained when the projection device according to the first example embodiment of the present invention projects a pattern image on a flat surface.

FIG. 4 illustrates an example of an expected image 201 which is expected to be displayed when the pattern image 120 is projected on a flat surface 200. The expected image 201 in FIG. 4 may be stored in advance in the storage unit 11, and is not required to be actually displayed. In FIG. 4, numerals indicated within some triangles denote numbers given to these triangles. A triangle in FIG. 3 and a triangle in FIG. 4 to which same numbers are given are triangles associated with each other. A difference in shape or position between these triangles is reflected on a distortion amount. A distortion amount increases, as a difference in shape or position between triangles associated with each other in FIG. 3 and FIG. 4 increases.

Figure 5:
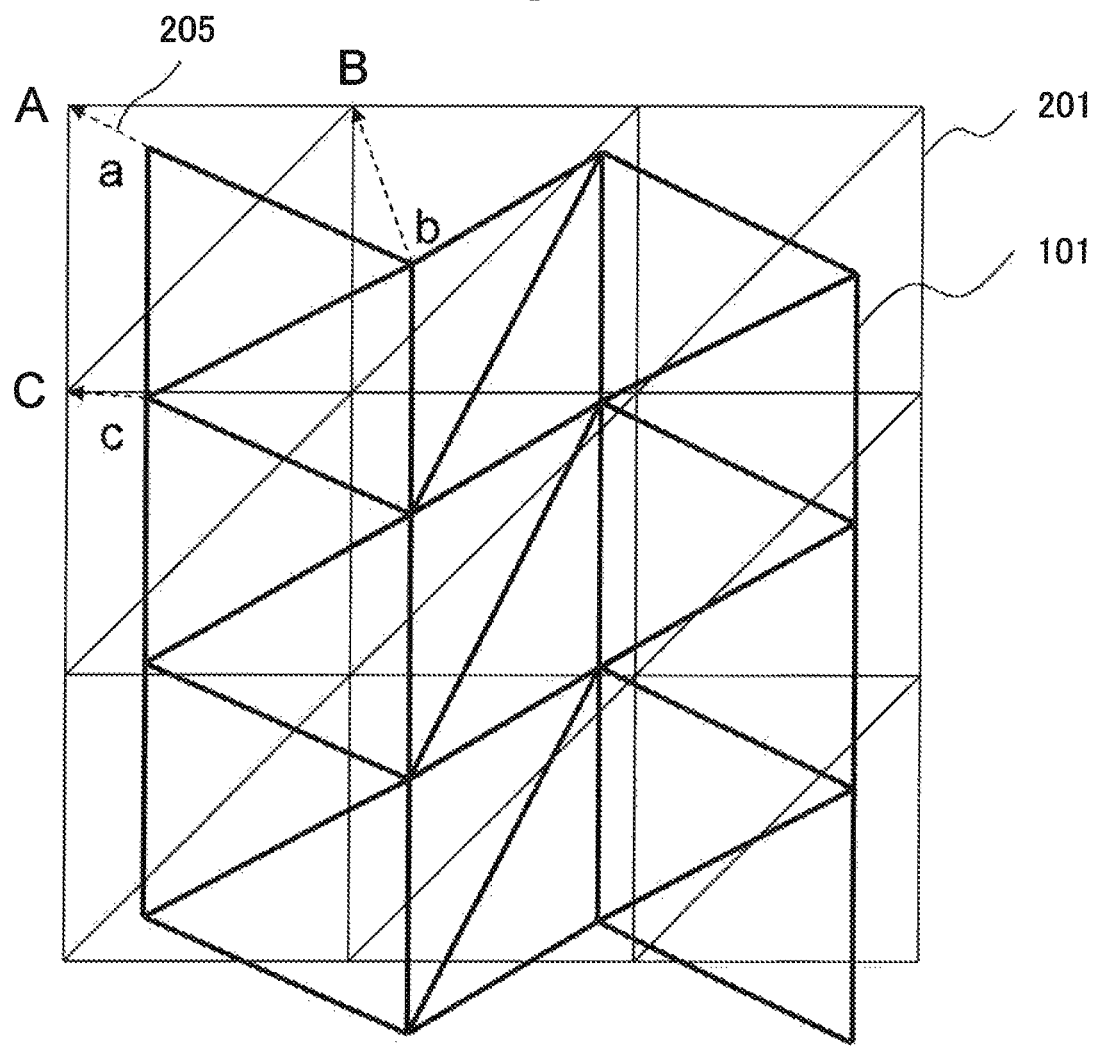
FIG. 5 is a conceptual diagram illustrating an example in which a pattern image and an expected image are compared in the projection device according to the first example embodiment of the present invention.

FIG. 5 is an example in which the displayed image 101 (corresponding to a distortion image) and the expected image 201 are compared. In the present example embodiment, the displayed image 101 and the expected image 201 are compared for each triangle. For example, a triangle abc on the upper left of the displayed image 101 is compared with a triangle ABC of the expected image 201. In the present example embodiment, a moving amount 205 between the triangle abc and the triangle ABC is calculated, and an inverse matrix (distortion parameter) is calculated from the moving amount 205 for each triangle. Specifically, the distortion amount calculating unit 15 calculates, as a distortion parameter, an inverse matrix of a matrix for transforming the triangle abc constituting the displayed image 101 (distortion image) to the triangle ABC constituting the expected image 201. The distortion correction processing unit 16 corrects distortion of the projection image 160 to be displayed on a projection surface, by using the inverse matrix to be calculated herein.

Figure 6:
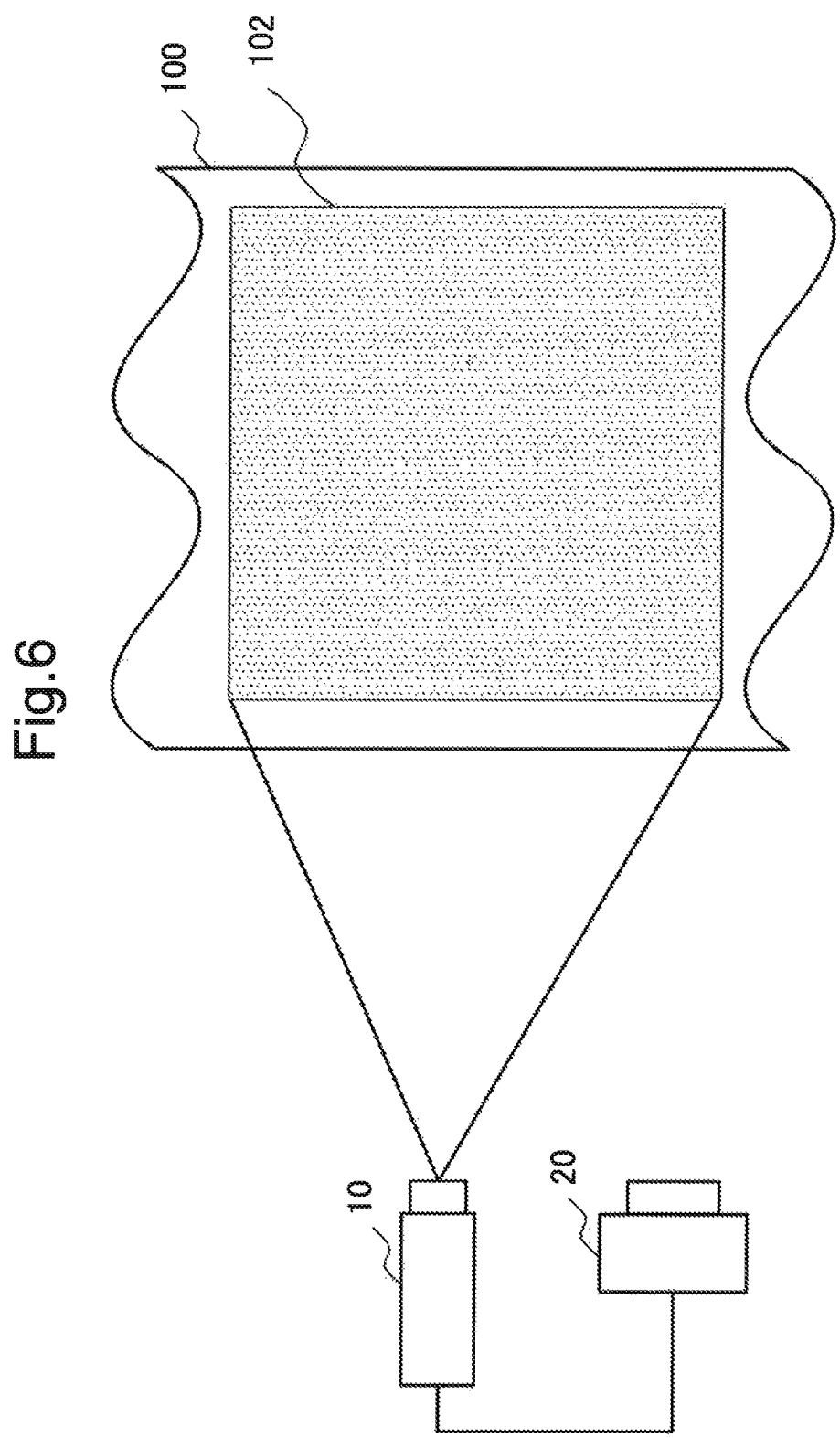
FIG. 6 is a conceptual diagram illustrating an example in which a projection image subjected to distortion correction with respect to an uneven surface is projected by the projection device according to the first example embodiment of the present invention.

FIG. 6 is an example in which the projection image 160 subjected to distortion correction is displayed on the uneven surface 100. In the present example embodiment, projecting an image to be projected from the projection device 10 by distorting the image in advance with use of a distortion parameter enables to display an image without distortion even when the image is projected on the uneven surface 100. Specifically, in the present example embodiment, by performing distortion correction in advance with respect to a projection image, which may be distorted when being projected on the uneven surface 100 as it is, as illustrated in FIG. 6, the projection image 160 is displayed on the uneven surface 100 as if the image is projected on a flat surface.

(Operation)

Figure 7:
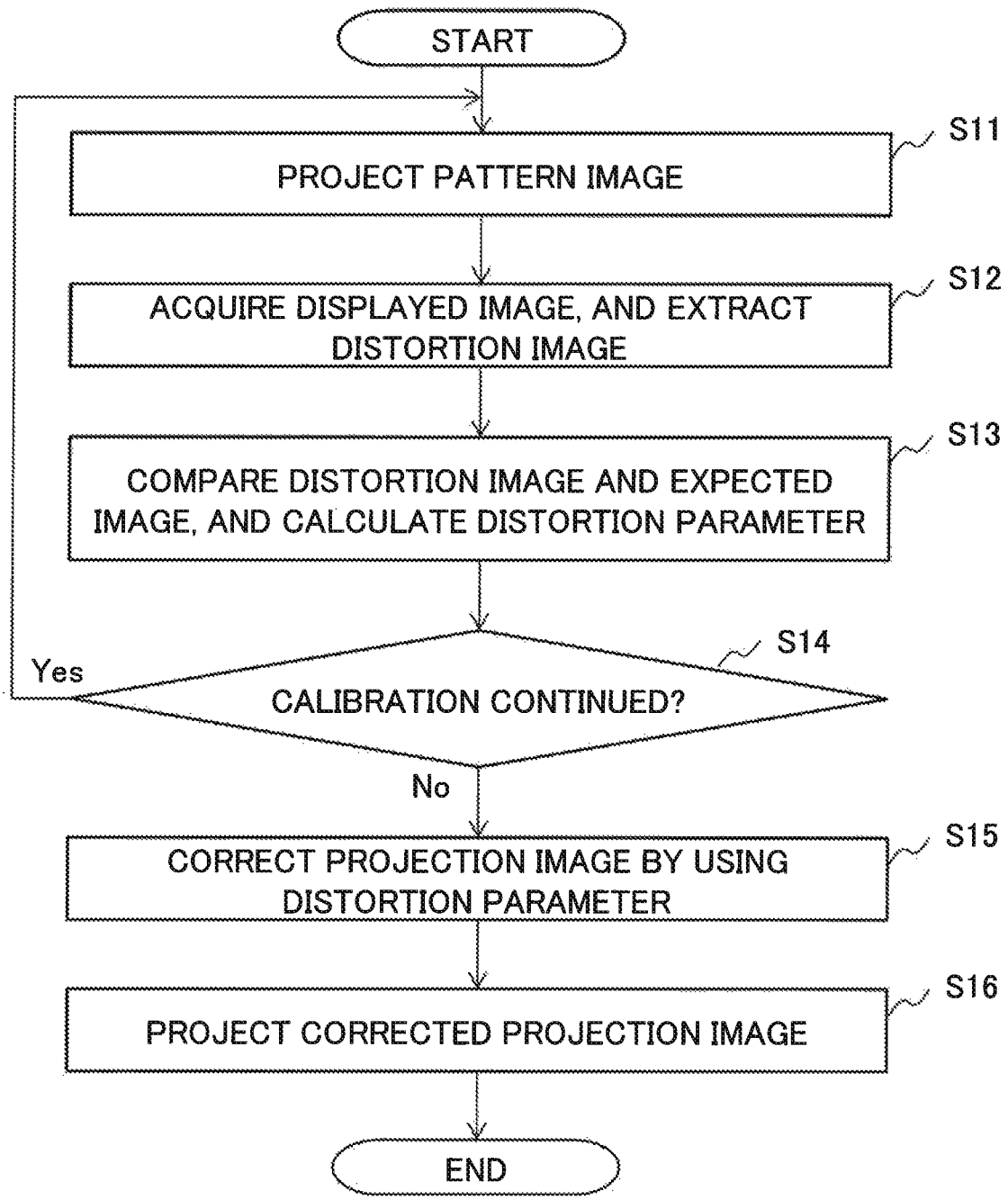
FIG. 7 is a flowchart for describing an operation of the projection device according to the first example embodiment of the present invention.

Next, an operation of the projection device according to the present example embodiment is described. FIG. 7 is a flowchart illustrating an operation of the projection device 10 according to the present example embodiment.

First of all, the image output unit 12 acquires the pattern image 120 from the storage unit 11, and outputs the acquired pattern image 120. The projection unit 13 projects the pattern image 120 output by the image output unit 12 (Step S11). The pattern image 120 projected from the projection unit 13 is displayed on a projection surface.

The camera 20 captures the displayed image 101 displayed on the projection surface. The image acquisition unit 14 acquires the displayed image 101 captured by the camera, and extracts the distortion image 140 from the acquired displayed image 101 (Step S12). The image acquisition unit 14 outputs the extracted distortion image 140 to the distortion amount calculating unit 15.

The distortion amount calculating unit 15 acquires the distortion image 140 from the image acquisition unit 14, and also acquires the expected image 150 from the storage unit 11. Then, the distortion amount calculating unit 15 calculates a distortion parameter by comparing the distortion image 140 with the expected image 150 (Step S13).

Herein, when there remains a triangle to be calibrated among triangles constituting the pattern image, and calibration is continued (Yes in Step S14), the flow returns to Step S11. On the other hand, when the calibration is finished (No in Step S14), the flow proceeds to Step S15.

When the calibration is finished (No in Step S14), the distortion correction processing unit 16 acquires a distortion parameter from the distortion amount calculating unit 15. The distortion correction processing unit 16 acquires the desired projection image 160 from the storage unit 11, and corrects the projection image 160 by using the distortion parameter (Step S15).

The image output unit 12 outputs the corrected projection image 160 to the projection unit 13. The projection unit 13 projects the corrected projection image 160 (Step S16).

The foregoing is description about an operation of the projection device according to the present example embodiment.

(Specific Example)

Figure 9:
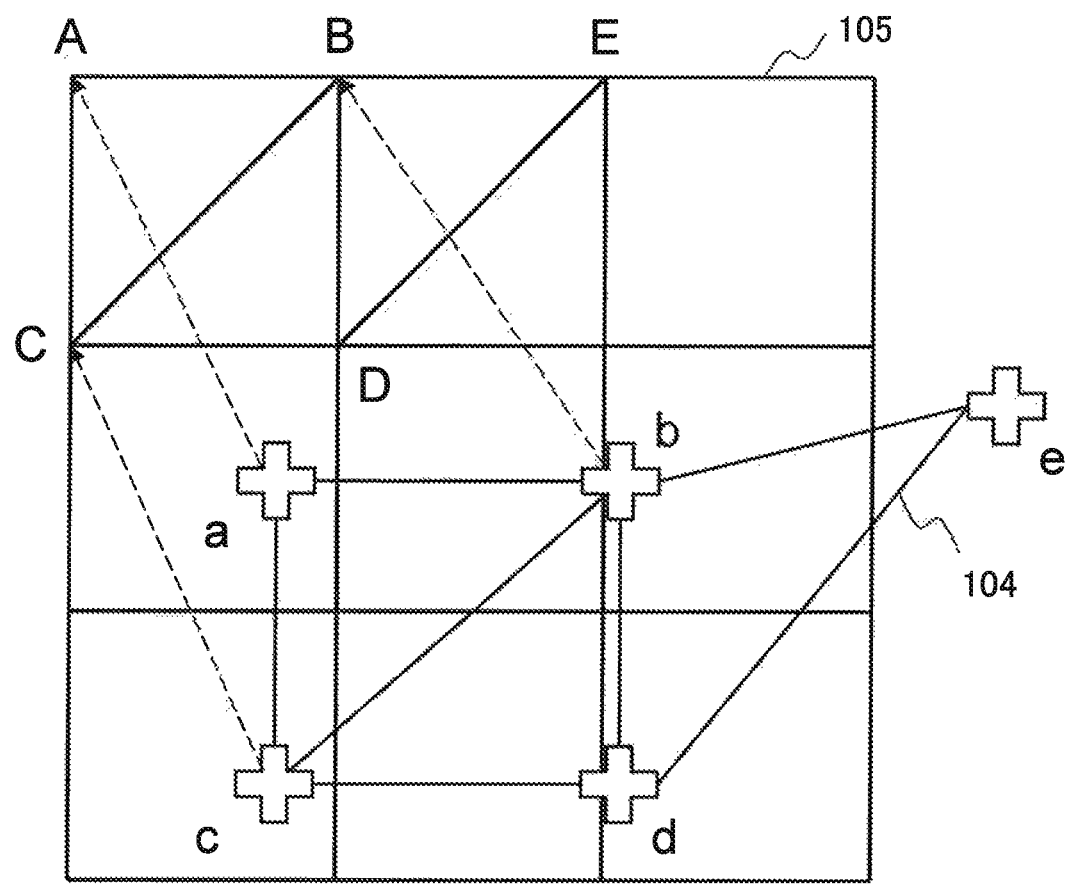
FIG. 9 is a conceptual diagram illustrating an example in which a pattern image and an expected image are compared in the projection device according to the first example embodiment of the present invention.
Figure 10:
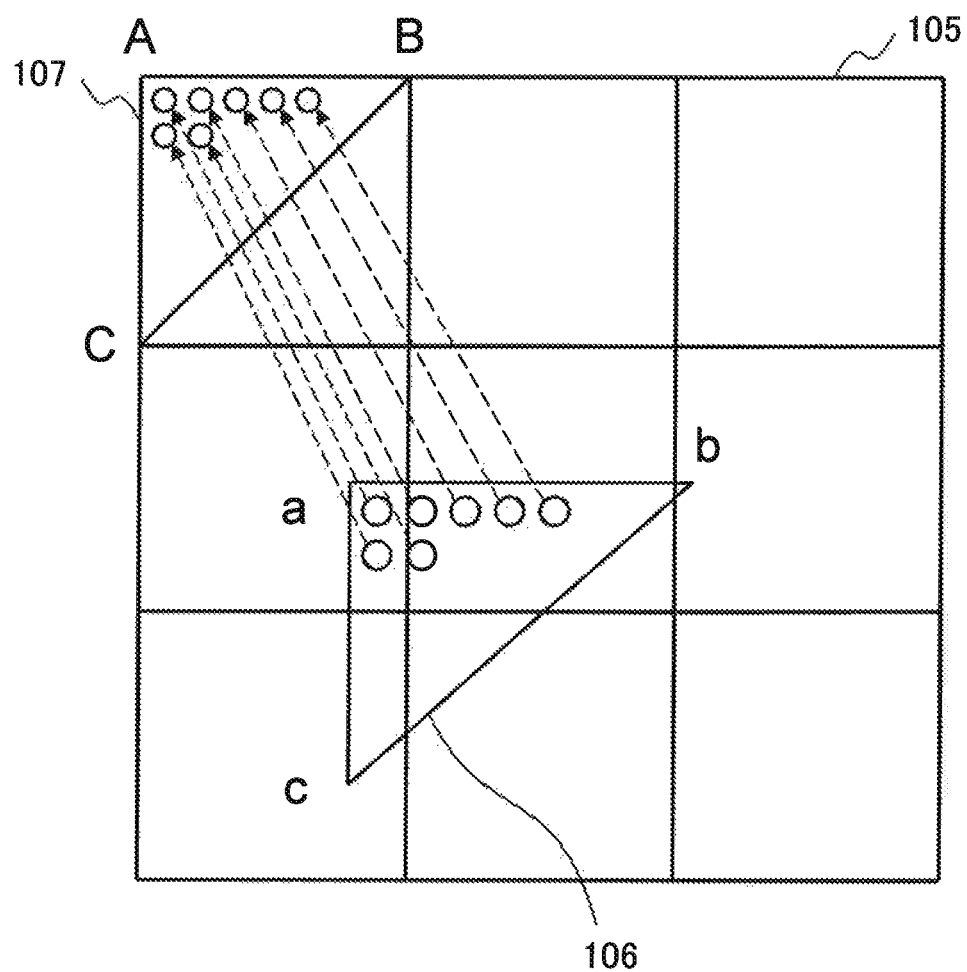
FIG. 10 is a conceptual diagram illustrating an example in which a projection image subjected to distortion correction with respect to an uneven surface is projected by the projection device according to the first example embodiment.

Herein, calibration to be performed by the projection device according to the present example embodiment is described in further detail with reference to FIG. 8 to FIG. 10.

Figure 8:
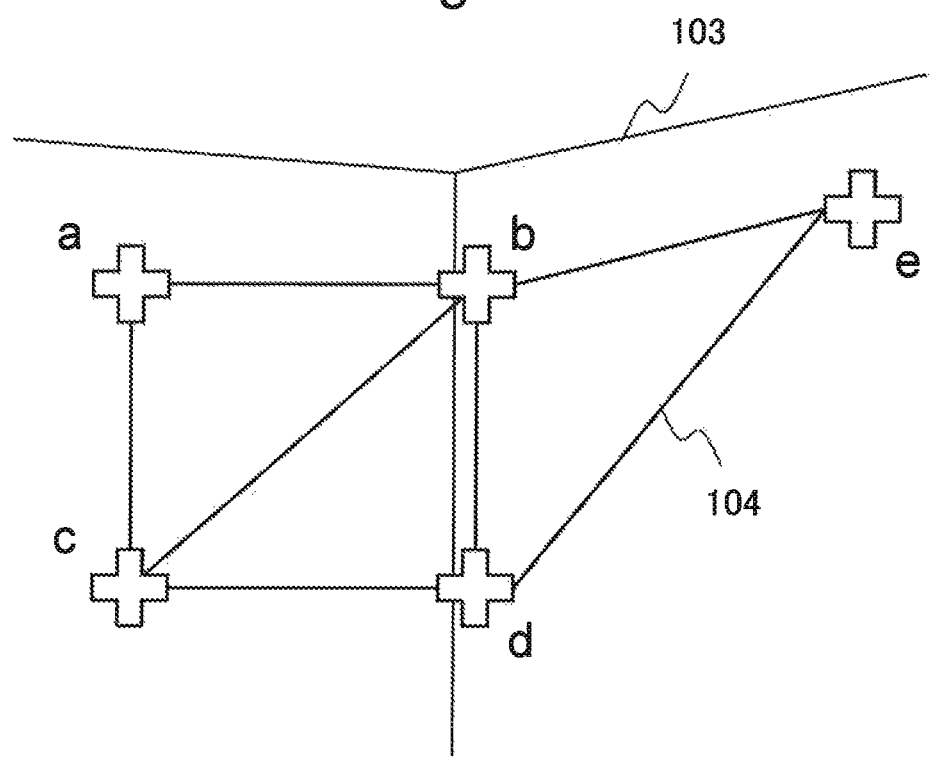
FIG. 8 is a conceptual diagram for describing an example in which a pattern image is projected on an uneven surface by the projection device according to the first example embodiment of the present invention.

FIG. 8 is an example in which a displayed image 104 is displayed on an uneven surface 103. In the example in FIG. 8, the displayed image 104 is displayed successively by projecting cross-shaped patterns on the uneven surface 103 in the order of a, b, c, d, e, . . . , and a distortion parameter is calculated for each triangle to be formed by three vertexes.

When calibration is started, the projection device 10 projects the patterns a, b, and c successively on the uneven surface 103. The projected cross-shaped patterns form a triangle abc. The camera 20 captures the uneven surface 103, and feeds back the triangle abc to the projection device 10. In this stage, only the triangle abc included in the displayed image 104 is acquired.

The distortion amount calculating unit 15 calculates an inverse matrix $T^{-1}$ by using a relationship expressed by the following Equation (1) with use of the acquired triangle abc and a triangle ABC of an expected image 105. The inverse matrix $T^{-1}$ is an inverse matrix of a transformation matrix T for transforming the triangle abc to the triangle ABC depending on a local state of the uneven surface 103, and corresponds to a distortion parameter. The triangle abc and the triangle ABC in Equation (1) are normally expressed by a two-dimensional coordinate system, but may be expressed by a three-dimensional coordinate system. A size or a component of the transformation matrix T is set in association with a coordinate system or a transformation condition of the triangle abc and the triangle ABC. Note that, when a distortion parameter is calculated, a moving amount of each vertex constituting a triangle, a distortion amount to be obtained from a difference in gradient of each side, a difference in area, and a shape, and the like may be considered.

$$\text{triangle abc} = T^{-1} \text{ triangle ABC} \quad (1)$$

Subsequently, the projection device 10 projects patterns d, e, . . . , successively, and obtains an inverse matrix (distortion parameter) in the order of a triangle bcd, a triangle cde, . . . . Specifically, the projection device 10 compares triangles included in the displayed image 104 and the expected image 105 and having a correlation, and calculates a distortion parameter for each triangle to be formed by a projection pattern. As a result of the calculation, the projection device 10 is able to obtain a distortion parameter depending on a local state of the uneven surface 103.

Next, an example in which a projection image is corrected by using an obtained distortion parameter is illustrated. As illustrated in FIG. 10, the distortion correction processing unit 16 corrects a projection image 106 by using a distortion parameter for each triangle.

Specifically, in order to display a displayed image subjected to distortion correction (hereinafter, distortion corrected image 107) on the uneven surface 103, the distortion correction processing unit 16 calculates a reference pixel position of the projection image 106 by applying an inverse matrix (distortion parameter) to the distortion corrected image 107. The distortion correction processing unit 16 may calculate a reference pixel position of the projection image 106 for each pixel of the distortion corrected image 107.

The distortion correction processing unit 16 calculates a reference pixel position of the projection image 106 for each triangle to be defined on the distortion corrected image 107. In this case, the distortion correction processing unit 16 completes an image needed to be displayed on the uneven surface 103 by calculating a reference pixel position of the projection image 106 with respect to an entire area of the distortion corrected image 107. Note that the distortion correction processing unit 16 may calculate a reference pixel position of the projection image 106 in a stage when a distortion parameter is calculated for all triangles defined on the distortion corrected image 107.

As described above, according to the present example embodiment, it is possible to display an image even on a projection surface having complex unevenness, as well as on a flat surface.

According to the present example embodiment, it is possible to enhance correction accuracy and to enhance image quality by reducing a size of a triangle constituting a pattern image on a projection surface having large unevenness. Further, according to the present example embodiment, it is possible to shorten time required for calibration by increasing a size of a triangle constituting a pattern image on a projection surface having small unevenness.

Figure 11:
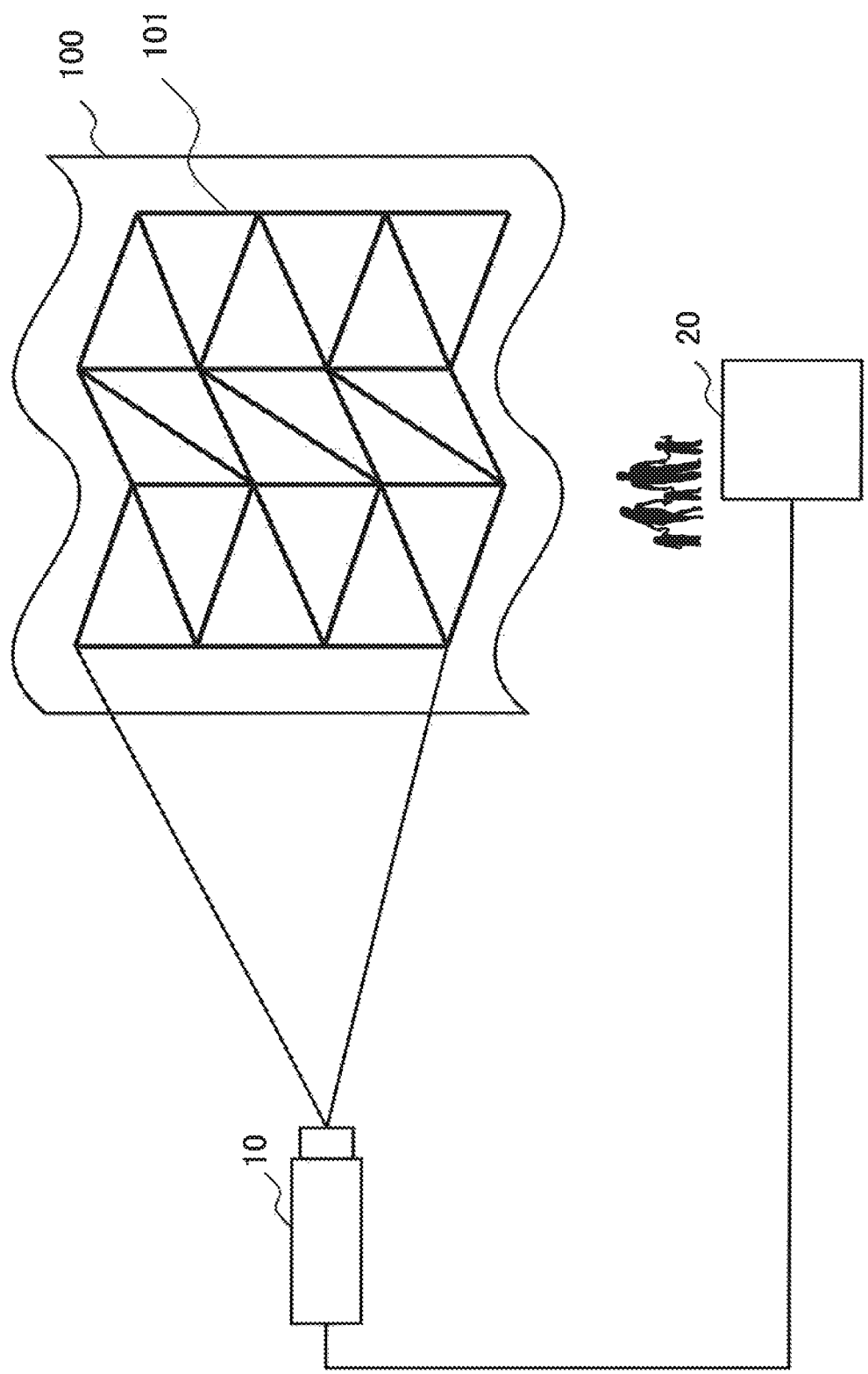
FIG. 11 is a conceptual diagram for exemplifying a position where a camera is disposed in the first example embodiment of the present invention.

Herein, a layout example of the camera 20 is illustrated (FIG. 11). In the example in FIG. 11, the camera 20 is disposed according to viewpoints of audiences who view an image projected on the uneven surface 100. Specifically, in FIG. 11, the camera 20 is disposed at a position where audiences view the uneven surface 100 (projection surface).

The camera 20 captures the displayed image 101 displayed on the uneven surface 100 from a position where audiences view the uneven surface 100.

The projection device 10 compares the displayed image 101 acquired from the camera 20 with the expected image 201, and detects distortion of the displayed image 101 from a difference between the displayed image 101 and the expected image 201. The distortion reflects distortion which occurs when audiences view the uneven surface 100 from the viewpoints of the audiences. The projection device 10 generates a distortion parameter from the distortion, and projects the projection image 160 corrected by the generated distortion parameter on the uneven surface 100. As a result of the projection, audiences are able to view a projection image without distortion on the uneven surface 100.

In general projection mapping, it is necessary to actually measure dimensions of a wall surface having unevenness where a projection image is displayed. Then, it is necessary to create a drawing with use of a computer aided design (CAD) or the like, taking into consideration a condition of the actually measured uneven surface. Further, it is necessary to create a virtual space within a personal computer by using three-dimensional computer graphics software or the like, and to adjust distortion of an image, while simulating how the image is actually displayed.

According to the present example embodiment, it is possible to perform calibration easily and within a short time even on site without measuring dimensions of a wall surface and without time and effort for distortion adjustment in a virtual space within a personal computer.

(Second Example Embodiment)

Next, a projection device according to a second example embodiment of the present invention is described. The projection device according to the second example embodiment performs calibration for projecting a projection image 160 on an uneven surface 100 having locally large distortion.

Figure 12:
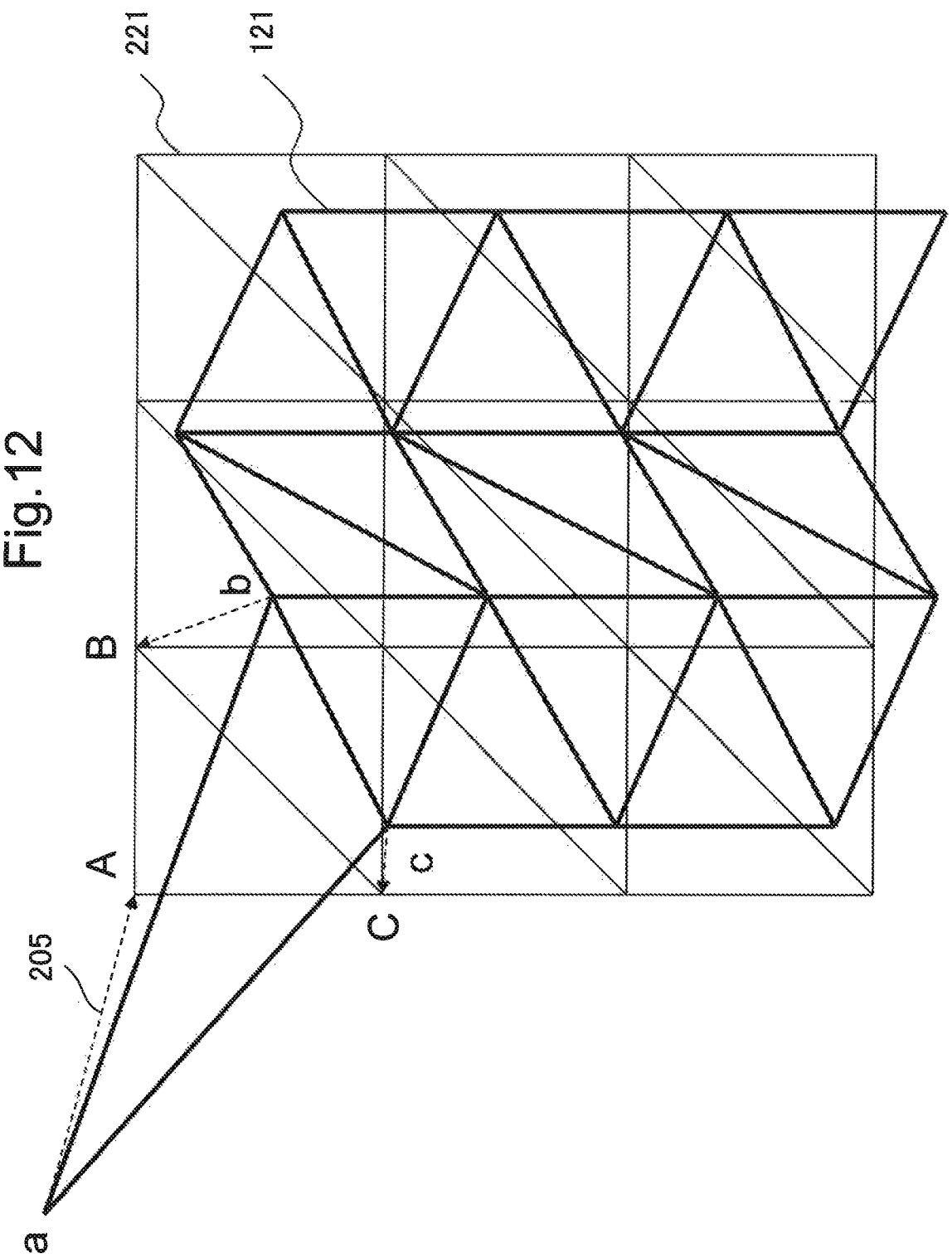
FIG. 12 is a conceptual diagram illustrating an example in which a pattern image and an expected image are compared in a projection device according to a second example embodiment of the present invention.

FIG. 12 illustrates an example in which a distortion image 121 displayed on an uneven surface having locally large distortion, and an expected image 221 associated with the distortion image 121 are compared. In FIG. 12, since a projection position of a pattern a is largely distorted, a moving amount 205 between a triangle abc and a triangle ABC is large.

As illustrated in FIG. 12, when locally large distortion occurs, a distortion amount calculating unit 15 outputs a command for subdividing a triangle having large distortion among triangles constituting a displayed image of a pattern image 120.

A distortion correction processing unit 16 performs processing of subdividing a triangle having large distortion in response to the command from the distortion amount calculating unit 15. Specifically, the distortion correction processing unit 16 subdivides an area constituting an expected image, when distortion equal to or larger than a certain amount occurs.

Figure 13:
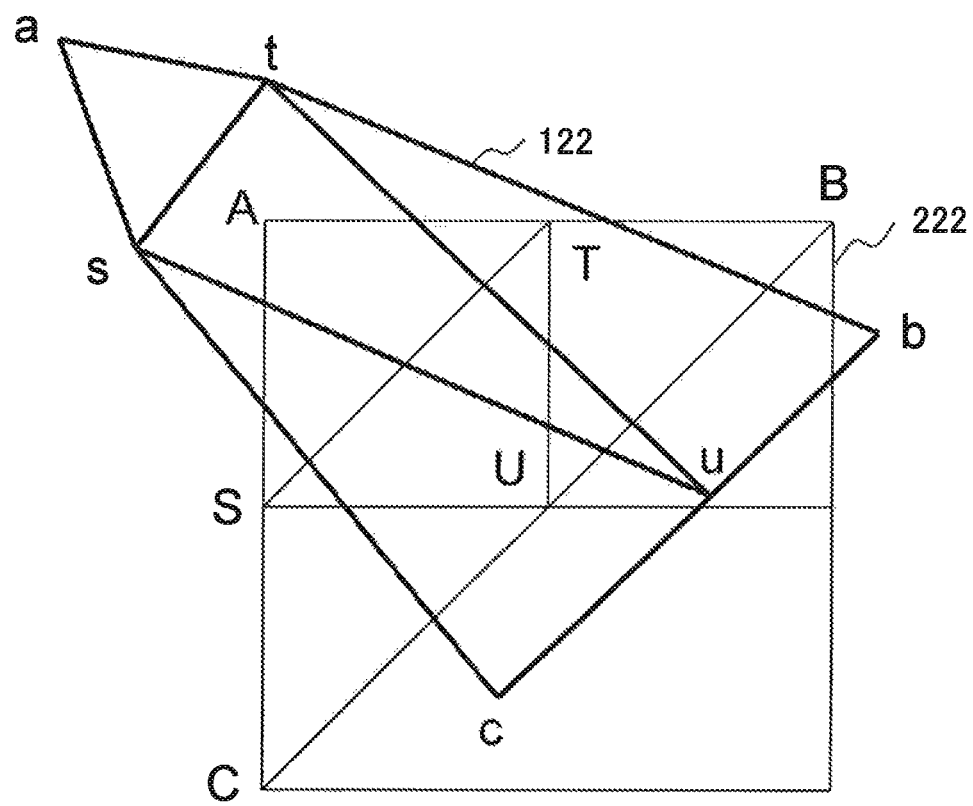
FIG. 13 is a conceptual diagram illustrating an example in which a pattern image is subdivided by the projection device according to the second example embodiment of the present invention.

As illustrated in FIG. 13, the distortion correction processing unit 16 generates an expected image 222 obtained by subdividing a part of the expected image 221. Note that FIG. 13 conceptually illustrates that a part of the expected image 221 is extracted, and does not accurately illustrate a positional relationship between a triangle ABC and a triangle abc in FIG. 12. In the present example embodiment, it is possible to display an image with further enhanced quality by creating a distortion corrected image from each subdivided area (triangle).

In the example in FIG. 13, a triangle ABC is subdivided into four triangles (a triangle AST, a triangle BUT, a triangle CSU, and a triangle SUT). The respective triangles (the triangle AST, the triangle BUT, the triangle CSU, and the triangle SUT) correspond to a triangle ast, a triangle but, a triangle csu, and a triangle sut.

As illustrated in FIG. 12, only when comparison is made between the triangle ABC and the triangle abc, it is difficult to display an appropriate image because distortion is too large. In such a case, subdividing the triangle ABC enables to eliminate local distortion, since it is possible to more finely reflect a local state of unevenness. Specifically, according to the present example embodiment, subdividing an area constituting the expected image 222 enables to accurately calculate a distortion parameter even when locally large distortion is present.

As described above, according to the present example embodiment, it is possible to provide an image with high quality even for local distortion, by subdividing a pattern image.

(Third Example Embodiment)

Next, a projection device according to a third example embodiment of the present invention is described. The projection device according to the third example embodiment illustrates an example in which a case that an end portion of a displayed image is lacked in display depending on a state of an uneven surface when projected in an ordinary method is handled. In the present example embodiment, calibration using an end pixel of an image (hereinafter, end pixel calibration) is performed before calibration according to the first example embodiment (main calibration).

Figure 14:
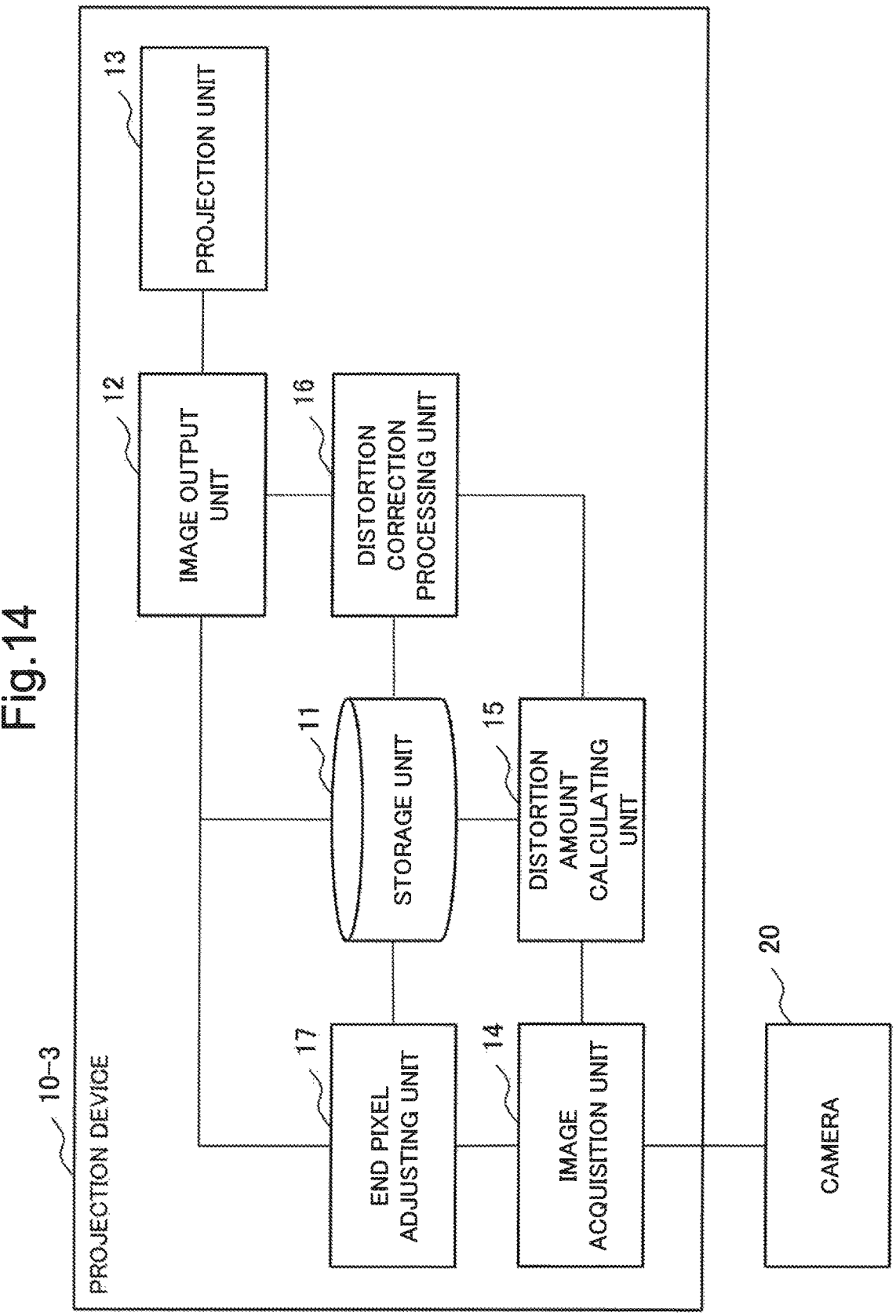
FIG. 14 is a block diagram illustrating a configuration of a projection device according to a third example embodiment of the present invention.

As illustrated in FIG. 14, a projection device 10-3 according to the present example embodiment has a configuration in which an end pixel adjusting unit 17 is added to the projection device 10 according to the first example embodiment.

The end pixel adjusting unit 17 performs end pixel calibration using an end pixel before the main calibration, when an end portion of a displayed image is lacked.

FIG. 15 illustrates an example in which an expected image 231 (left side) desired to be displayed is displayed like a displayed image 232 (right side), depending on a surface state of a projection surface. The displayed image 232 (right side) is displayed on an uneven surface in a state that both side portions are lacked.

FIG. 16 is a conceptual diagram for describing end pixel calibration.

First of all, in end pixel calibration, end pixel reference is performed along an end portion of the expected image 231. In end pixel reference, the projection device 10-3 projects pixels of an end portion (hereinafter, end pixels) in the order of 1→2→3→4 as illustrated in the right side of FIG. 16.

A camera 20 captures an end pixel projected in the order on the right side of FIG. 16. The projection device 10-3 calculates an end pixel reference position 234 (right side of FIG. 16) which is defined from a position of the end pixel captured by the camera 20.

Next, as illustrated in the left side of FIG. 17, the end pixel adjusting unit 17 generates an image obtained by superimposing the end pixel reference position 234 and the expected image 231. In this case, both side portions of the expected image 231 are deviated from the end pixel reference position 234. When a projection image 160 is projected in the aforementioned state, an image is displayed in a state that an end portion of the projection image 160 is lacked.

Herein, as illustrated in the right side of FIG. 17, the end pixel adjusting unit 17 generates a shrunk expected image 235 obtained by shrinking the expected image 231 in such a manner that the shrunk expected image 235 is present within an area of the end pixel reference position 234.

When the main calibration is performed by using the shrunk expected image 235 generated by the end pixel adjusting unit 17, lacking does not occur even when the projection image 160 is projected.

As described above, in the projection device according to the present example embodiment, it is possible to appropriately display a projection image in a state that an end portion is not lacked, when the end portion is lacked depending on a condition of a projection surface.

(Hardware Configuration)

FIG. 18 is a block diagram illustrating an example of hardware configurations of the projection devices according to the first to third example embodiments of the present invention. Note that FIG. 18 is a configuration example for implementing the projection devices according to the respective example embodiments, and a configuration may be added/deleted according to a required specification.

A processor 91 is an arithmetic device for extracting a program stored in a storage medium 98 or the like to a main storage device 95 or the like, and executing the extracted program. The processor 91 may be configured by a general central processing unit (CPU). A part of functions of the distortion amount calculating unit 15 and the distortion correction processing unit 16 may be performed by the processor 91.

A projection system 92 is a projection device including a light source, a liquid crystal panel, a projection lens, and the like. The light source is configured by using a halogen lamp, a xenon lamp, a metal halide lamp, an ultra-high pressure mercury lamp, a laser, or the like. The liquid crystal panel partially cuts off or transmits light emitted from the light source. The projection lens is a lens for projecting light transmitted through the liquid crystal panel, on a projection surface. Note that the projection system 92 may include a control system for controlling a projecting direction, a magnification ratio, and the like. Functions of the projection unit 13 may be performed by the projection system 92.

A converter 93 is a circuit having a function of converting analog data input from outside into digital data, and a function of converting digital data generated inside into analog data. The converter 93 may be such that an analog/digital (A/D) converter for converting analog data into digital data, and a digital/analog (D/A) converter for converting digital data into analog data are individually configured. For example, the image acquisition unit 14 may have an A/D conversion function, and the image output unit 12 may have a D/A conversion function.

The main storage device 95 is a device having a storage area for temporarily extracting a program or data handled by the processor 91. For example, a random access memory (RAM) may be configured as the main storage device 95. A part of functions of the storage unit 11 may be performed by the main storage device 95.

An input-output interface 96 is an interface for transmitting/receiving data to/from input-output devices on outside and inside. For example, the input-output interface 96 is connected to a camera 20. Further, for example, the input-output interface 96 may be connected to an input device such as an unillustrated keyboard and an unillustrated mouse, an unillustrated display, an unillustrated printer, a network, or the like. When the projection unit 13 is treated as an input-output device, functions of the image output unit 12 may be performed by the input-output interface 96.

An image processing circuit 97 is a circuit for performing various processing with respect to image data. The image processing circuit 97 is an integrated circuit for performing image processing such as dark current correction, interpolation calculation, color space conversion, gamma correction, aberration correction, noise reduction, and image compression with respect to captured image data, for example. A part of functions of the distortion amount calculating unit 15 and the distortion correction processing unit 16 may be performed by the image processing circuit 97.

The storage medium 98 is a medium for storing a program and data. For example, it is possible to use a hard disk or the like as the storage medium 98. Further, a read only memory (ROM) may be added to the storage medium 98. Functions of the storage unit 11 may be performed by the storage medium 98. The storage medium may be implemented by a semiconductor storage medium such as a secure digital (SD) card and a universal serial bus (USB) memory, for example. Further, the storage medium may be implemented by a magnetic storage medium such as a flexible disk, an optical storage medium such as a compact disk (CD) and a digital versatile disc (DVD), or another storage medium.

The foregoing is an example of a hardware configuration for enabling a projection device according to an example embodiment of the present invention. Note that the hardware configuration in FIG. 18 is an example of a hardware configuration for enabling a projection device according to the present example embodiment, and does not limit the scope of the present invention. Further, a processing program which causes a computer to execute processing by the projection device according to the present example embodiment is also included in the scope of the present invention. Further, a program storage medium recording a processing program according to an example embodiment of the present invention is also included in the scope of the present invention.

In the foregoing, the present invention is described with reference to example embodiments. The present invention, however, is not limited to the aforementioned example embodiments. The configuration and details of the present invention may be modified in various ways comprehensible to a person skilled in the art within the scope of the present invention.

This application is based upon and claims the benefit of priority from Japanese Patent Application No. 2015-171877, filed on Sep. 1, 2015, the disclosure of which is incorporated herein in its entirety by reference.

REFERENCE SIGNS LIST

10 Projection device
11 Storage unit
12 Image output unit
13 Projection unit
14 Image acquisition unit
15 Distortion amount calculating unit
16 Distortion correction processing unit
17 End pixel adjusting unit
20 Camera
91 Processor
92 Projection system
93 Converter
95 Main storage device
96 Input-output interface
97 Image processing circuit
98 Storage medium

What is claimed is:

1. A projection device comprising:
storage circuitry that stores at least a pattern image for detecting distortion depending on a surface state of a projection surface, an expected image associated with a displayed image when the pattern image is displayed on a flat surface, and a desired projection image;
a projector that projects, on the projection surface, an image including the pattern image and the desired projection image;
image acquisition circuitry that acquires a displayed image of the pattern image displayed on the projection surface, and extracts a distortion image;
distortion amount calculating circuitry that calculates a distortion parameter relating to distortion of the projection surface by comparing the expected image with the distortion image;
distortion correction processing circuitry that corrects the desired projection image to be projected on the projection surface, by using the distortion parameter; and
image output circuitry that outputs, to the projector, image data including the desired projection image corrected by the distortion correction processing circuitry, and the pattern image
wherein the storage circuitry store the pattern image and the expected image divided into a plurality of areas associated with each other,
the projector projects vertexes of the pattern image successively, and the distortion amount calculating circuitry calculates, each time vertexes on a displayed image of the pattern image displayed on the projection surface, the distortion parameter for each of the plurality of areas successively.

2. The projection device according to claim 1, further comprising
a camera that captures the projection surface, and outputs the captured image data to the image acquisition circuitry, wherein
the image acquisition circuitry
extracts a displayed image of the pattern image from the acquired image data, as the distortion image.

3. The projection device according to claim 1, wherein
the distortion amount calculating circuitry
compares associated areas of the distortion image corresponding to the displayed image of the pattern image, and the expected image, and calculates the distortion parameter.

4. The projection device according to claim 3, wherein
the distortion amount calculating circuitry
calculates an inverse matrix of a matrix for transforming a triangle constituting the distortion image to a triangle constituting the expected image, as the distortion parameter.

5. The projection device according to claim 3, wherein
the projector
projects vertexes of a triangle constituting the pattern image successively, and
the distortion amount calculating circuitry
calculates, each time vertexes on a displayed image of the pattern image displayed on the projection surface form a triangle, the distortion parameter relating to a formed triangle successively.

6. The projection device according to claim 2, wherein
the camera
is disposed at a position where the projection surface is viewed.

7. The projection device according to claim 3, wherein
the distortion amount calculating circuitry
outputs a command for subdividing a triangle in which distortion equal to or larger than a certain amount occurs, among triangles constituting the distortion image, and
the distortion correction processing circuitry
subdivides a triangle constituting the expected image and being associated with a triangle in which distortion equal to or larger than the certain amount occurs, in response to a command of the distortion amount calculating circuitry.

8. The projection device according to claim 1, further comprising
end pixel adjusting circuitry that adjusts a display area of an image to be displayed on the projection surface, when a peripheral portion of an image to be displayed on the projection surface is lacked, wherein
the projector
projects a pixel of an end portion of the expected image on the projection surface,
the image acquisition circuitry
acquires a position of a pixel of the end portion displayed on the projection surface,
the end pixel adjusting circuitry
generates a shrunk expected image obtained by shrinking the expected image in such a manner as to be present within an area of an end pixel reference position to be defined from a position of a pixel of the end portion acquired by the image acquisition circuitry,
the image output circuitry
outputs, to the projector, the pattern image shrunk in association with the shrunk expected image,
the projector
projects the shrunk pattern image output by the image output circuitry, on the projection surface, and
the distortion amount calculating circuitry
calculates the distortion parameter by comparing the distortion image corresponding to a displayed image of the shrunk pattern image with the shrunk expected image.

9. A projection method comprising:
projecting vertexes of a pattern image, which is divided into a plurality of areas, for detecting distortion depending on a surface state of a projection surface, on the projection surface successively;
acquiring a displayed image of the pattern image displayed on the projection surface, and extracting a distortion image;
calculating a distortion parameter of the projection surface by comparing an expected image, which is divided into a plurality of areas associated with the plurality of areas of the pattern image, associated with a displayed image when the pattern image is displayed on a flat surface, with the distortion image for each of the plurality of areas successively, each time vertexes on a displayed image of the pattern image displayed on the projection surface;
correcting a desired projection image to be projected on the projection surface, by using the distortion parameter; and
projecting the corrected desired projection image on the projection surface.

10. A non-transitory program storage medium storing a projection program that causes a computer to execute:
processing of projecting vertexes of a pattern image, which is divided into a plurality of areas, for detecting distortion depending on a surface state of a projection surface, on the projection surface successively;
processing of acquiring a displayed image of the pattern image displayed on the projection surface, and extracting a distortion image;
processing of calculating a distortion parameter of the projection surface by comparing an expected image, which is divided into a plurality of areas associated with the plurality of areas of the pattern image, associated with a displayed image when the pattern image is displayed on a flat surface, with the distortion image for each of the plurality of areas successively, each time vertexes on a displayed image of the pattern image displayed on the projection surface;
processing of correcting a desired projection image to be projected on the projection surface, by using the distortion parameter; and
processing of projecting the corrected desired projection image on the projection surface.

* * * * *